(12) United States Patent
Schmidt et al.

(10) Patent No.: US 7,500,541 B2
(45) Date of Patent: Mar. 10, 2009

(54) ACOUSTIC MATERIAL WITH LIQUID REPELLENCY

(75) Inventors: Richard J. Schmidt, Roswell, GA (US); Michael David Powers, Canton, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 190 days.

(21) Appl. No.: 10/954,503

(22) Filed: Sep. 30, 2004

(65) Prior Publication Data

US 2006/0065482 A1   Mar. 30, 2006

(51) Int. Cl.
*E04B 1/82* (2006.01)
*B32B 5/02* (2006.01)
*E04B 2/02* (2006.01)
*B32B 5/26* (2006.01)

(52) U.S. Cl. .................. 181/290; 442/65; 442/382
(58) Field of Classification Search ............ 181/290, 181/284
See application file for complete search history.

(56) References Cited

U.S. PATENT DOCUMENTS

| | | | |
|---|---|---|---|
| 3,692,618 A | 9/1972 | Dorschner et al. |
| 3,802,817 A | 4/1974 | Matsuki et al. |
| 3,849,241 A | 11/1974 | Butin et al. |
| 3,855,046 A | 12/1974 | Hansen et al. |
| 4,041,203 A | 8/1977 | Brock et al. |
| 4,242,398 A | 12/1980 | Segawa et al. |
| 4,307,143 A | 12/1981 | Meitner |
| 4,340,563 A | 7/1982 | Appel et al. |
| 4,374,888 A | 2/1983 | Bornslaeger |
| 4,420,526 A | 12/1983 | Schilling et al. |
| 4,451,589 A | 5/1984 | Morman et al. |
| 4,488,928 A | 12/1984 | Ali Khan et al. |
| 4,707,398 A | 11/1987 | Boggs |
| 5,025,052 A | 6/1991 | Crater et al. |
| 5,064,802 A | 11/1991 | Stevens et al. |
| 5,073,436 A | 12/1991 | Antonacci et al. |
| 5,108,820 A | 4/1992 | Kaneko et al. |
| 5,149,576 A | 9/1992 | Potts et al. |
| 5,153,157 A | 10/1992 | Hlatky et al. |
| 5,169,706 A | 12/1992 | Collier, IV et al. |

(Continued)

FOREIGN PATENT DOCUMENTS

EP   0648602 A1   4/1995

(Continued)

OTHER PUBLICATIONS

MicroPatent Abstract, JP63215446A, Sep. 7, 1988.

(Continued)

*Primary Examiner*—Edgardo San Martin
(74) *Attorney, Agent, or Firm*—Robert A. Ambrose; Vincent T. Kung; Ralph H. Dean, Jr.

(57) ABSTRACT

A nonwoven acoustic insulating material which also provides repellency to water and low surface tension fluids. Also disclosed is a method for attenuating transmitted sound and repelling fluids which includes providing a nonwoven acoustic insulating material, the nonwoven acoustic insulating material including at least one nonwoven web having a low surface tension fluids repellency treatment, and interposing the treated nonwoven acoustic insulating material between a sound generation area and a sound receiving area.

16 Claims, 2 Drawing Sheets

U.S. PATENT DOCUMENTS

| | | | |
|---|---|---|---|
| 5,178,931 | A | 1/1993 | Perkins et al. |
| 5,204,429 | A | 4/1993 | Kaminsky et al. |
| 5,213,881 | A | 5/1993 | Timmons et al. |
| 5,272,236 | A | 12/1993 | Lai et al. |
| 5,278,272 | A | 1/1994 | Lai et al. |
| 5,298,694 | A | 3/1994 | Thompson et al. |
| 5,332,613 | A | 7/1994 | Taylor et al. |
| 5,336,552 | A | 8/1994 | Strack et al. |
| 5,374,696 | A | 12/1994 | Rosen et al. |
| 5,380,778 | A | 1/1995 | Buckanin |
| 5,382,400 | A | 1/1995 | Pike et al. |
| 5,451,450 | A | 9/1995 | Elderly et al. |
| 5,459,291 | A | 10/1995 | Haines et al. |
| 5,539,056 | A | 7/1996 | Yang et al. |
| 5,539,124 | A | 7/1996 | Etherton et al. |
| 5,554,775 | A | 9/1996 | Krishnamurti et al. |
| 5,596,052 | A | 1/1997 | Resconi et al. |
| 5,677,027 | A | 10/1997 | Masuda et al. |
| 5,681,963 | A | 10/1997 | Liss |
| 5,736,465 | A | 4/1998 | Stahl et al. |
| 5,773,375 | A | 6/1998 | Swan et al. |
| 5,789,491 | A | 8/1998 | Liss et al. |
| 5,841,081 | A | 11/1998 | Thompson et al. |
| 5,858,515 | A | 1/1999 | Stokes et al. |
| 5,886,306 | A | 3/1999 | Patel |
| 5,898,046 | A | 4/1999 | Raiford et al. |
| 5,945,643 | A * | 8/1999 | Casser ......................... 181/290 |
| RE36,323 | E | 10/1999 | Thompson et al. |
| 5,961,904 | A | 10/1999 | Swan et al. |
| 6,057,254 | A | 5/2000 | Bender et al. |
| 6,145,617 | A | 11/2000 | Alts |
| 6,174,964 | B1 | 1/2001 | Jariwala et al. |
| 6,284,843 | B1 | 9/2001 | Jariwala et al. |
| 6,288,157 | B1 | 9/2001 | Jariwala et al. |
| 6,309,987 | B1 * | 10/2001 | Srinivasan .................. 442/147 |
| 6,376,396 | B1 | 4/2002 | Thorn et al. |
| 6,391,807 | B1 | 5/2002 | Jariwala et al. |
| 6,446,691 | B1 | 9/2002 | Maldonado et al. |
| 6,461,133 | B1 | 10/2002 | Lake et al. |
| 6,474,967 | B1 | 11/2002 | Haynes et al. |
| 6,524,691 | B2 | 2/2003 | Sugawara et al. |
| 6,613,704 | B1 * | 9/2003 | Arnold et al. ................ 442/361 |
| 6,619,947 | B2 | 9/2003 | Maldonado et al. |
| 6,631,785 | B2 | 10/2003 | Khambete et al. |
| 6,632,386 | B2 | 10/2003 | Shelley et al. |
| 6,635,329 | B1 | 10/2003 | Arndt et al. |
| 6,659,223 | B2 | 12/2003 | Allison et al. |
| 6,669,265 | B2 | 12/2003 | Tilton et al. |
| 6,676,195 | B1 | 1/2004 | Marriott et al. |
| 6,720,068 | B1 | 4/2004 | Vanbemmel et al. |
| 6,726,980 | B2 | 4/2004 | Staelgraeve et al. |
| 6,753,380 | B2 | 6/2004 | Qiu |
| 6,756,332 | B2 | 6/2004 | Sandoe et al. |
| 7,114,621 | B2 * | 10/2006 | Hester et al. ................ 210/490 |
| 2002/0160682 | A1 * | 10/2002 | Zeng et al. .................. 442/411 |
| 2003/0087103 | A1 | 5/2003 | Belmares et al. |
| 2003/0104749 | A1 | 6/2003 | Emirze |
| 2003/0118816 | A1 | 6/2003 | Polanco et al. |
| 2003/0148096 | A1 | 8/2003 | Groten et al. |
| 2003/0162903 | A1 * | 8/2003 | Day .......................... 525/276 |
| 2003/0199216 | A1 | 10/2003 | Gomez et al. |
| 2003/0203687 | A1 | 10/2003 | Akuzawa |
| 2004/0023014 | A1 | 2/2004 | Williamson et al. |
| 2004/0100125 | A1 | 5/2004 | Ogawa et al. |
| 2004/0235380 | A1 * | 11/2004 | Kapik ........................ 442/79 |
| 2005/0051567 | A1 * | 3/2005 | Bell et al. ..................... 221/33 |
| 2005/0079379 | A1 * | 4/2005 | Wadsworth et al. ......... 428/684 |
| 2006/0003154 | A1 * | 1/2006 | Snowden et al. ......... 428/304.4 |
| 2006/0003167 | A1 * | 1/2006 | Quincy et al. ............... 428/421 |
| 2006/0008651 | A1 * | 1/2006 | Day .......................... 428/421 |
| 2006/0013983 | A1 * | 1/2006 | Sebastian et al. ........... 428/40.1 |

FOREIGN PATENT DOCUMENTS

| | | |
|---|---|---|
| EP | 0755325 B1 | 9/2001 |
| EP | 1312655 A2 | 5/2003 |
| EP | 1321554 A1 | 6/2003 |
| EP | 1342561 A1 | 9/2003 |
| EP | 1058618 B1 | 2/2004 |
| EP | 1233886 B1 | 2/2004 |
| JP | 3129098 B2 | 1/2001 |
| WO | WO 01/49531 | 7/2001 |
| WO | WO 02/04730 | 1/2002 |
| WO | WO 02/09089 | 1/2002 |
| WO | WO 02/072537 | 9/2002 |
| WO | WO 02/072657 | 9/2002 |
| WO | WO 03/057465 | 7/2003 |
| WO | WO 03/065345 | 8/2003 |
| WO | WO 03/089731 | 10/2003 |
| WO | WO 2004/012889 | 2/2004 |
| WO | WO 2004/013395 | 2/2004 |
| WO | WO 2004/038116 | 5/2004 |
| WO | WO 2004/060657 | 7/2004 |

OTHER PUBLICATIONS

MicroPatent Abstract, JP11350363A, Dec. 21, 1999.
Patent Abstracts of Japan, Pub. No. 09144161A, Jun. 3, 1997.
Patent Abstracts of Japan, Pub. No. 11327566A, Nov. 26, 1999.
Patent Abstracts of Japan, Pub. No. 11350363A, Dec. 21, 1999.
Patent Abstracts of Japan, Pub. No. 2000096734A, Apr. 4, 2000.
Patent Abstracts of Japan, Pub. No. 2000238157A, Sep. 5, 2000.
Patent Abstracts of Japan, Pub. No. 2001055657A, Feb. 27, 2001.
Patent Abstracts of Japan, Pub. No. 2001064859A, Mar. 13, 2001.
Patent Abstracts of Japan, Pub. No. 2001279567A, Oct. 10, 2001.
Patent Abstracts of Japan, Pub. No. 2002069823A, Mar. 8, 2002.
Patent Abstracts of Japan, Pub. No. 2002069824A, Mar. 8, 2002.
ASTM Designation: F 778-88 (Reapproved 2001), "Standard Methods for Gas Flow Resistance Testing of Filtration Media", Jan. 29, 1988, pp. 1-15.
Method 5450, Federal Test Method Standard No. 191A, "Permeability to Air; Cloth; Calibrated Orifice Method", Jul. 1978.

* cited by examiner

ACOUSTIC MATERIAL WITH LIQUID REPELLENCY

FIELD OF THE INVENTION

The present invention relates generally to acoustic insulation and more particularly to nonwoven acoustic insulating materials with liquid repellency properties, and to a method for repelling liquids while acoustically insulating vehicles, appliances, architectural applications and other locations where sound attenuation is desired or required.

BACKGROUND OF THE INVENTION

Various acoustic insulating materials, that is, sound insulating or sound attenuating materials, are known in the art. Acoustic insulating materials have been used in a variety of applications, for example, to reduce noise coming from running appliances and HVAC systems, to reduce the amount of noise entering buildings and/or traveling from room to room within a building, and to reduce noise entering a vehicle cabin from the outer environment and from the engine compartment, and the like. The selection of a particular acoustic insulating material is governed by several factors, including cost, desired thickness, weight and the ability to attenuate sound. Acoustic insulating materials attenuate sound by either absorbing sound waves which strike and enter the acoustic insulating material or by reflecting such sound waves outward and away from the acoustic insulating material, and often sound attenuation is achieved by both sound absorption and sound reflection.

Conventional sound insulating materials include materials such as compressed fibers, recycled fiber or shoddy materials, fiberglass or mineral fiber batts, felts and fibrous nonwoven webs such as bonded carded webs, meltblown webs, and spunbond webs. Depending on fiber size and type of fiber, such materials may also have been partly resistant to water intrusion. However, these materials have less success protecting against intrusion by low surface tension liquids such as salt-laden water, alcohols, aldehydes and ketones, and hydrophilic liquids, such as those containing surfactants or detergents or other cleaning compositions.

Where better water and low surface tension fluids intrusion protection was desired, such conventional materials have been laminated to film facing materials, such as thermoplastic films, or foil-type facing materials in order to provide a barrier to liquids. Foam acoustic insulating materials, such as for example closed cell foams, have also been known to provide fluid barrier while providing sound insulation. Moreover, closed cell foams and acoustic insulating material laminates having film or foil facings, while providing adequate fluid barrier, also tend to have extremely low breathability. That is, they tend to provide a near absolute barrier to the movement of air. In addition, the provision of additional barrier-specific layers such as film or foil facings may add an undesirable amount of expense and/or additional undesired weight to the acoustic insulating material. Furthermore, these non-porous films and foils when used as a facing may alter or degrade the acoustic performance of the acoustic insulating material.

Therefore, there exists a continuing need for acoustic insulating materials that, in addition to providing sound insulation or sound attenuation properties, also provide for repellency to water and low surface tension fluids and without deleteriously affecting the acoustic properties.

SUMMARY OF THE INVENTION

The present invention provides a fluid repellent nonwoven acoustic insulating material, and a method for attenuating transmitted sound and repelling fluids. The method for attenuating transmitted sound and repelling fluids includes the steps of providing a nonwoven acoustic insulating material, where the nonwoven acoustic insulating material includes at least one nonwoven web having a low surface tension fluids repellency treatment, and interposing the nonwoven acoustic insulating material between a sound generation area and a sound receiving area. The at least one nonwoven web may desirably be such as meltblown webs, spunbond webs and laminates of meltblown and spunbond webs, including spunbond-meltblown-spunbond laminate webs. The low surface tension fluids repellency treatment may desirably be a fluorochemical treatment, and may be an internal treatment or a topically applied treatment, and the treatment may be present in laminates in a higher concentration in the sound generation area-facing layer than in the sound receiving area-facing layer. The acoustic insulating material may further include one or more additional layers laminated to the nonwoven layer or layers having the repellency treatment, and such additional layers may desirably be one or more other nonwoven layers, such as a high-loft nonwoven layer, or other conventional insulating layers such as shoddy layers, fiberglass layers, mineral fiber layers or foam layers.

DETAILED DESCRIPTION OF THE INVENTION

Definitions

As used herein and in the claims, the term "comprising" is inclusive or open-ended and does not exclude additional unrecited elements, compositional components, or method steps. Accordingly, the term "comprising" encompasses the more restrictive terms "consisting essentially of" and "consisting of".

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries. As used herein the term "thermoplastic" or "thermoplastic polymer" refers to polymers that will soften and flow or melt when heat and/or pressure are applied, the changes being reversible.

As used herein the term "monocomponent" filament refers to a filament formed from one or more extruders using only one polymer extrudate. This is not meant to exclude filaments formed from one polymer to which small amounts of additives have been added for color, anti-static properties, lubrication, hydrophilicity, etc.

As used herein the term "multicomponent filaments" refers to filaments that have been formed from at least two component polymers, or the same polymer with different properties or additives, extruded from separate extruders but spun together to form one filament. Multicomponent filaments are also sometimes referred to as conjugate filaments or bicomponent filaments, although more than two components may be used. The polymers are arranged in substantially constantly positioned distinct zones across the cross-section of the multicomponent filaments and extend continuously along the length of the multicomponent filaments. The configuration of such a multicomponent filament may be, for example, a concentric or eccentric sheath/core arrangement wherein one polymer is surrounded by another, or may be a side by side arrangement, an "islands-in-the-sea" arrangement, or arranged as pie-wedge shapes or as stripes on a round, oval or rectangular cross-section filament, or other configurations. Multicomponent filaments are taught in U.S. Pat. No. 5,108,820 to Kaneko et al. and U.S. Pat. No. 5,336,552 to Strack et al. Conjugate fibers are also taught in U.S. Pat. No. 5,382,400 to Pike et al. and may be used to produced crimp in the fibers by using the differential rates of expansion and contraction of the two (or more) polymers. For two component filaments, the polymers may be present in ratios of 75/25, 50/50, 25/75 or any other desired ratios. In addition, any given component of a multicomponent filament may desirably comprise two or more polymers as a multiconstituent blend component.

As used herein the-terms "biconstituent filament" or "multiconstituent filament" refer to a filament formed from at least two polymers, or the same polymer with different properties or additives, extruded from the same extruder as a blend. Multiconstituent filaments do not have the polymer components arranged in substantially constantly positioned distinct zones across the cross-section of the multicomponent filaments; the polymer components may form fibrils or protofibrils that start and end at random.

As used herein the terms "nonwoven web" or "nonwoven fabric" refer to a web having a structure of individual fibers or filaments that are interlaid, but not in an identifiable manner as in a knitted or woven fabric. Nonwoven fabrics or webs have been formed from many processes such as for example, meltblowing processes, spunbonding processes, airlaying processes, and carded web processes. The basis weight of nonwoven fabrics is usually expressed in grams per square meter (gsm) or ounces of material per square yard (osy) and the filament diameters useful are usually expressed in microns. (Note that to convert from osy to gsm, multiply osy by 33.91).

The terms "spunbond" or "spunbond fiber" or "spunbond fiber web" refer to a nonwoven fiber or filament material of small diameter filaments that are formed by extruding molten thermoplastic polymer as filaments from a plurality of capillaries of a spinneret. The extruded filaments are cooled while being drawn by an eductive or other well known drawing mechanism. The drawn filaments are deposited or laid onto a forming surface in a generally random manner to form a loosely entangled filament web, and then the laid filament web is subjected to a bonding process to impart physical integrity and dimensional stability. The production of spunbond fabrics is disclosed, for example, in U.S. Pat. No. 4,340,563 to Appel et al., U.S. Pat. No. 3,692,618 to Dorschner et al., and U.S. Pat. No. 3,802,817 to Matsuki et al. Typically, spunbond fibers or filaments have a weight-per-unit-length in excess of about 1 denier and up to about 6 denier or higher, although both finer and heavier spunbond filaments can be produced. In terms of filament diameter, spunbond filaments often have an average diameter of larger than 7 microns, and more particularly between about 10 and about 25 microns, and up to about 30 microns or more.

As used herein the term "meltblown fibers" means fibers or microfibers formed by extruding a molten thermoplastic material through a plurality of fine, usually circular, die capillaries as molten threads or filaments or fibers into converging high velocity gas (e.g. air) streams that attenuate the fibers of molten thermoplastic material to reduce their diameter. Thereafter, the meltblown fibers are carried by the high velocity gas stream and are deposited on a collecting surface to form a web of randomly dispersed meltblown fibers. Such a process is disclosed, for example, in U.S. Pat. No. 3,849,241 to Buntin, U.S. Pat. No. 4,307,143 to Meitner et al., and U.S. Pat. No. 4,707,398 to Wisneski et al., all incorporated herein by reference in their entireties. Meltblown fibers may be continuous or discontinuous, are often smaller than 10 microns in average diameter and are frequently smaller than 7 or even 5 microns in average diameter, and are generally tacky when deposited onto a collecting surface.

As used herein "carded webs" refers to nonwoven webs formed by carding processes as are known to those skilled in the art and further described, for example, in coassigned U.S. Pat. No. 4,488,928 to Alikhan and Schmidt which is incorporated herein in its entirety by reference. Briefly, carding processes involve starting with staple fibers in a bulky batt that is combed or otherwise treated to provide a web of generally uniform basis weight.

As used herein, "thermal point bonding" involves passing a fabric or web of fibers or other sheet layer material to be bonded between a heated calender roll and an anvil roll. The calender roll is usually, though not always, patterned on its surface in some way so that the entire fabric is not bonded across its entire surface. As a result, various patterns for calender rolls have been developed for functional as well as aesthetic reasons. One example of a pattern has points and is the Hansen Pennings or "H&P" pattern with about a 30% bond area with about 200 bonds/square inch as taught in U.S. Pat. No. 3,855,046 to Hansen and Pennings. The H&P pattern has square point or pin bonding areas wherein each pin has a side dimension of 0.038 inches (0.965 mm), a spacing of 0.070 inches (1.778 mm) between pins, and a depth of bonding of 0.023 inches (0.584 mm). The resulting pattern has a bonded area of about 29.5%. Another typical point bonding pattern is the expanded Hansen and Pennings or "EHP" bond pattern which produces a 15% bond area with a square pin having a side dimension of 0.037 inches (0.94 mm), a pin spacing of 0.097 inches (2.464 mm) and a depth of 0.039 inches (0.991 mm). Other common patterns include a high density diamond or "HDD pattern", which comprises point bonds having about 460 pins per square inch (about 71 pins per square centimeter) for a bond area of about 15% to about 23% and a wire weave pattern looking as the name suggests, e.g. like a window screen. Typically, the percent bonding area varies from around 10% to around 30% or more of the area of the fabric or web. Another known thermal calendering bonding method is the "pattern unbonded" or "point unbonded" or "PUB" bonding as taught in U.S. Pat. No. 5,858,515 to Stokes et al., wherein continuous bonded areas define a plurality of discrete unbonded areas. Thermal bonding (point bonding or point-unbonding) imparts integrity to individual layers by bonding fibers within the layer and/or for laminates of multiple layers, such thermal bonding holds the layers together to form a cohesive laminate material.

The present invention provides a method for attenuating transmitted sound and repelling fluids. The present invention further provides a fluid repellent nonwoven acoustic insulating material. The invention will be described with reference to the following description and Figures which illustrate certain embodiments. It will be apparent to those skilled in the art that these embodiments do not represent the full scope of the invention which is broadly applicable in the form of variations and equivalents as may be embraced by the claims appended hereto. Furthermore, features described or illustrated as part of one embodiment may be used with another embodiment to yield still a further embodiment. It is intended that the scope of the claims extend to all such variations and equivalents.

The nonwoven acoustic insulating material possesses a degree of repellency to water and low surface tension liquids such as salt-laden water, alcohols, aldehydes and ketones, and hydrophilic liquids, such as those containing surfactants or detergents or other cleaning compositions, in order to more fully protect the interior of the space being acoustically insulated from invasion from these liquids. Examples include automotive acoustic insulation, which desirably also provides a measure of protection against water, windshield washer fluids, car wash detergents, and other cleaning fluids. Repellency to water and low surface tension liquids is also highly desirable for architectural or building applications where it is desirable to provide a measure of protection against liquid intrusion at the same time as sound attenuation or acoustic insulation function is provided. In addition to protecting the interior of an insulated space from liquid intrusion, the liquid repellent properties of the nonwoven also help to protect the acoustic insulation itself, and other insulating layers with which it may be combined as a laminate, against the structural collapse which may occur when an open fibrous structure is wetted.

The method for attenuating transmitted sound and repelling fluids includes the steps of providing a nonwoven acoustic insulating material having a treatment additive which provides repellency to low surface tension fluids and then interposing the treated nonwoven acoustic insulating material between a sound generation area and a sound receiving area. By "attenuating transmitted sound" and "sound attenuation", what is meant is absorption and/or reflection of incident sound waves to reduce the amount of sound which enters a sound receiving area.

The nonwoven acoustic insulating material may desirably include a microfiber web layer such as a meltblown web layer as is known in the art. Meltblown fiber layers are very useful for providing a layer having at least partial resistance to the passage of liquids, while still allowing gases and vapors such as air and water vapor to pass through. Such meltblown webs may be produced as described above according to the methods generally disclosed in, for example, U.S. Pat. No. 3,849,241 to Buntin, U.S. Pat. No. 4,307,143 to Meitner et al., and U.S. Pat. No. 4,707,398 to Wisneski et al. Also, multicomponent microfibers such as bicomponent or multicomponent meltblown microfibers are known in the art and may desirably be utilized. Multicomponent fibers in meltblowing production processes are described in U.S. Pat. No. 6,461,133 to Lake et al. and U.S. Pat. No. 6,474,967 to Haynes et al., both incorporated herein by reference in their entireties.

Where a meltblown web is used in the acoustic insulating material, it is desirable for the meltblown web to have a relatively high pressure drop and low permeability, in order to better provide sound attenuation properties. Web density and web pore size, and pore size distribution all have an effect on the pressure drop and permeability. For example, such a meltblown web may desirably have a density in excess of about 50 kg/m$^3$. While an upper limit of density is not believed to be critical, from a practical standpoint of producing a meltblown nonwoven web the upper limit for the density is about 250 kg/m$^3$. Highly desirable are meltblown webs having density between about 50 kg/m$^3$ and about 150 kg/M$^3$. Fiber sizes have an effect on the pore sizes of the web, with finer (smaller diameter) fibers tending to contribute to a smaller effective pore size in the web material. Therefore, where the nonwoven acoustic insulating material contains a meltblown web it is desirable for the average meltblown fiber diameter to be 10 microns or less, and more desirably 7 microns or less. More particularly, such meltblown fibers may be less than about 5 microns in average diameter, and still more particularly between about 1 and about 4 microns in average diameter. Exemplary meltblown web materials which may be utilized in the practice of the invention are disclosed in co-assigned published U.S. patent application Publication No. 2004/0023014 to Williamson et al., published Feb. 5, 2004.

Figure 1:
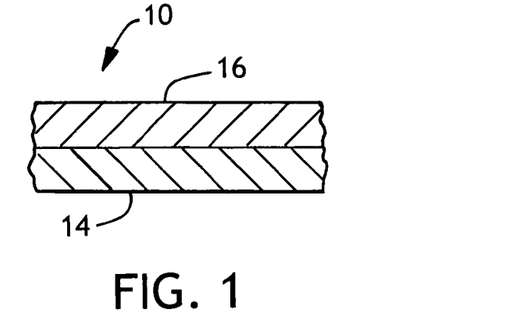
FIG. 1 is a schematic illustration of an embodiment of a nonwoven acoustic insulating material having a two-layer laminate structure.

The nonwoven acoustic insulating material may desirably further include multiple nonwoven web layers. As an example, the nonwoven acoustic insulating material may include a composite or laminate of multiple nonwoven web materials, such as for example meltblown-meltblown laminate materials, spunbond-meltblown ("SM") laminate materials or spunbond-meltblown-spunbond ("SMS") laminate materials. Exemplary SM and SMS laminate materials are disclosed in U.S. Pat. No. 4,041,203 to Brock et al., U.S. Pat. No. 5,169,706 to Collier, et al. and U.S. Pat. No. 4,374,888 to Bornslaeger, all incorporated herein by reference in their entireties. An exemplary two-layer laminate, such as an SM laminate material, is shown in side-view in FIG. 1. As shown in FIG. 1, the two-layer laminate material is generally designated 10 and includes a first layer 14 and a second layer 16. Either or both of the first and second layers (14, 16) may desirably include one or more treatment additives to impart repellency to water and low surface tension fluids.

Figure 2:
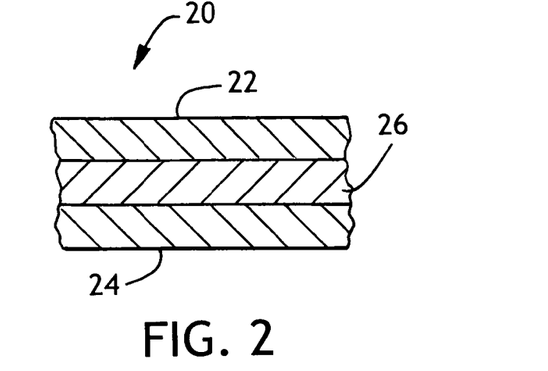
FIG. 2 is a schematic illustration of another embodiment a nonwoven acoustic insulating material, having a three-layer laminate structure.
Figure 3:
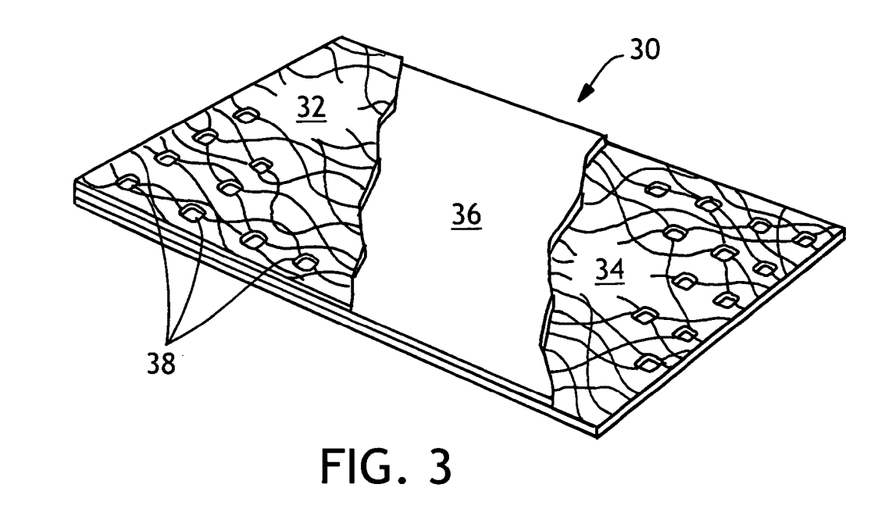
FIG. 3 is a partially cut-away perspective view of a three-layer laminate structure of a nonwoven acoustic insulating material.

FIG. 2 and FIG. 3 illustrate exemplary three-layer laminate materials, such as SMS type laminates. In FIG. 2 the tri-layer laminate material, generally designated 20, is shown in side-view and includes a first outer layer 22 and a second outer layer 24 with an inner layer 26 sandwiched therebetween. FIG. 3 illustrates another tri-layer laminate material 30 shown in a partially cut-away view showing an inner layer 36 sandwiched between a first outer layer 32 and a second outer layer 34. As shown in FIG. 3, the outer layers 32 and 34 may be fibrous layers such as spunbond or meltblown fibrous layers. Additionally shown in FIG. 3 are exemplary bond points 38 such as may be made by a thermal point bonding process. Any of the first and second outer layers or the inner layer as are shown in FIG. 2 or FIG. 3 may desirably include one or more treatment additives to impart repellency to water and low surface tension fluids. However, as discussed in more detail below, at least the nonwoven web layer which faces the sound generation area should include a repellency treatment additive.

It should be noted that bonding between layers of a laminate or composite is optional. That is, a laminate or composite acoustic insulating material may be constructed by simply layering the component materials together without bonding, or by bonding either substantially continuously or intermittently along the face-to-face plane of the component layers, or by bonding only the edges of the layers together to form a composite or laminate having the layers bonded together along a portion or the entirety of the periphery of the composite. Where bonding of layers is desired it may be done by any suitable methods as are known in the art, such as thermal bonding, ultrasonic bonding, stitch bonding, adhesive bonding, needling or entangling and the like.

As another example, the nonwoven acoustic insulating material may comprise a laminate of nonwoven web layers which includes a high-loft nonwoven web material. High-loft materials often incorporate mechanically or helically crimped fibers to produce a web having more void volume between the fibers, and thus a less dense and more lofty web structure. Desirably, such lofty nonwoven webs have a density of less than about 50 kg/m$^3$, and still more desirably a density less than about 30 kg/m$^3$. For particular applications, such lofty webs may desirably have a density of less than about 20 kg/m$^3$, or a density less than about 10 kg/m$^3$, or even a density less than about 5 kg/m$^3$. Examples include bonded carded webs of staple fibers and various lofty spunbond webs of multicomponent fibers such as those described in U.S. Pat. No. 5,382,400 to Pike et al., incorporated herein by reference in its entirety, and in co-assigned U.S. Pat. Appln. Publication No. 2003/0118816 to Polanco et al., published Jun. 26, 2003, incorporated herein by reference in its entirety. In addition, lofty spunbond webs utilizing or incorporating crimped monocomponent fibers are also known in the art, and such may be produced utilizing the teachings disclosed in U.S. Pat. No. 6,632,386 to Shelley and Brown, U.S. Pat. No. 6,446,691 to Maldonado et al. and U.S. Pat. No. 6,619,947 to Maldonado et al., all incorporated herein by reference in their entireties.

Figure 4:
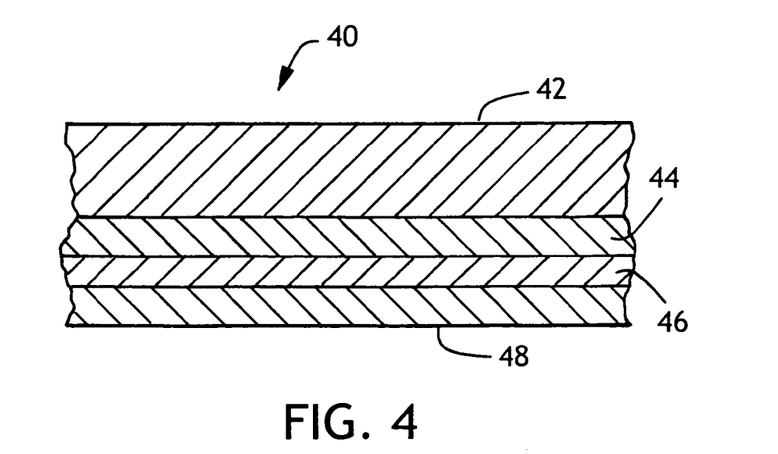
FIG. 4 is a schematic illustration of a laminate nonwoven acoustic insulating material including a high-loft nonwoven web layer.

Examples of such laminates including a high-loft nonwoven web material include meltblown/high-loft laminates, spunbond/high-loft laminates, SM/high-loft laminates, SMS/high-loft laminates, and the like. FIG. 4 illustrates an exemplary multi-layer laminate material including a high-loft nonwoven web layer. In FIG. 4, the multi-layer laminate material generally designated 40, is shown in side-view and includes a high-loft layer 42 and less lofty (more dense) layers 44, 46 and 48. Layers 44, 46 and 48 together may desirably comprise a SMS type laminate material as was discussed above, with layers 44 and 48 being spunbond layers and layer 46 being a meltblown layer. However, layers 44, 46 and 48 may also comprise other types of webs, such as multiple spunbond layers, multiple meltblown layers, etc. As mentioned above, the layers of such a laminate or composite may be bonded together as described above, or may be simply layered together.

Whether the nonwoven acoustic insulating material includes a single layer or multiple layers, at least one nonwoven web layer should include a treatment additive which assists the nonwoven acoustic insulating material to be repellent to fluids such as water or low surface tension fluids. Low surface tension fluids include, for example, salt-laden water, alcohols, aldehydes and ketones, and hydrophilic liquids, such as those containing surfactants or detergents or other cleaning compositions. Where the nonwoven acoustic insulating material includes multiple layers, at least the nonwoven web layer which is closest to or faces the sound generation area should include a repellency treatment additive. For example, where the sound receiving area being acoustically insulated is the interior or cabin area of an automobile, the nonwoven web layer which faces the exterior of the automobile (the sound generation area) should include the repellency treatment additive in order to help protect the acoustic insulating material against soaking by fluids coming from the outside of the automobile and help protect the interior of the automobile itself from outside fluid penetration.

As a specific example, the nonwoven acoustic insulating material may include a spunbond-meltblown-spunbond or SMS laminate material as discussed above, and at least the spunbond web layer of the SMS laminate which faces the sound generation area should include a low surface tension fluids repellency treatment additive. In addition, where additional levels of repellency are desired, other layers of the SMS laminate, such as the meltblown layer and/or sound receiving area-facing spunbond layer, may also desirably include a low surface tension fluids repellency treatment.

As another example, where the nonwoven acoustic insulating material comprises a laminate of nonwoven web layers which include a high-loft nonwoven web material as discussed above, at least the web layer of the laminate which faces the sound generation area should include a low surface tension fluids repellency treatment additive. For example, where the nonwoven acoustic insulating material comprises an SMS-high loft laminate material, the SMS portion of the laminate may desirably be the sound generation area-facing portion of the acoustic insulating material and therefore at least the SMS should have a treatment for low surface tension fluids repellency.

As still other examples of laminates, the nonwoven acoustic insulating material may comprise a repellency-treated nonwoven material which may or may not itself be a laminate such as a meltblown layer, spunbond-meltblown layer, or SMS layer, which is laminated to one or more other types of layer such as, for example, recycled fiber or shoddy material layers, fiberglass batts or ceramic fiber or mineral fiber batts, felted fiber layers, and open or closed cell foam layers.

As stated, at least the sound generation area-facing portion of the acoustic insulating material should include a treatment additive which provides repellency to water and low surface tension fluids. Additive treatments comprising fluorine, for example, are useful treatments for producing repellency to water and other liquids. Fluorochemical repellents and particularly fluorochemicals comprising perfluorinated aliphatic groups (i.e., fully fluorinated) are well known in the art.

Fluorochemicals can be produced using a telomer chemistry process, which generally use an alkyl linking group such as an ethylene linking group (—C2H4-) between the fluoroaliphatic group and the hydrocarbon chain making up the remainder of the fluorochemical or fluoropolymer. Telomer chemistry processes are known to produce fluorochemicals having a distribution of fluoroaliphatic group lengths. For example, a single run or batch of such a process may produce fluorochemicals having perfluorohexane groups, perfluorooctane groups, perfluorodecane groups, etc., often with the majority of the fluoroaliphatic groups being perfluorooctane groups. Exemplary fluorochemicals are disclosed, for example, in U.S. Pat. No. 5,681,963 to Liss, U.S. Pat. No. 5,789,491 to Liss et al., and U.S. Pat. No. 5,898,046 to Raiford et al., all incorporated herein by reference in their entireties. Suitable fluorochemicals are available from the E. I. du Pont de Nemours and Company of Wilmington, Del. and sold under the brand name ZONYL®, and available from Daikin America, Inc. of Orangeburg, N.Y., under the trade name UNIDYNE.

Other fluorochemicals are known to be produced by electrochemical processes, such as the fluorochemical repellents disclosed in U.S. Pat. No. 5,025,052 to Crater et al., incorporated herein by reference in its entirety. Electrochemically produced fluorochemicals typically have a sulfonamide linking group (—S(O2)N(R)—) between the fluoroaliphatic group and the hydrocarbon chain making up the remainder of the fluorochemical or fluoropolymer, although other linking groups, and particularly hetero atom containing groups such as —O—, —S—, —SO—, etc. may be used. Electrochemical production processes generally result in essentially a non-distribution of fluoroaliphatic groups, i.e. a single moiety of the fluoroaliphatic groups linked to the hydrocarbon chain, such as for example (where the linking group is a sulfonamide group) a perfluorobutanesulfonamide group or a perfluorooctanesulfonamide. Other exemplary fluorochemical compounds are disclosed in U.S. Pat. No. 5,149,576 to Potts et al. and U.S. Pat. No. 5,178,931 to Perkins et al., both incorporated herein by reference in their entireties.

Such low surface tension fluids repellency treatment additives may be added to a nonwoven web in an amount from greater than 0% by weight of the nonwoven web up to about 5% by weight. More particularly, such repellency treatment additives, such as fluorochemicals, may be added to a nonwoven web in an amount from about 0.1% to about 4% by weight, and still more particularly in an amount from about 0.25% to about 2.5% by weight of the nonwoven web. One or more low surface tension fluids repellency treatment additives may be applied topically, or as internal melt additives, or both.

Processes or methods for topical treatment of additives onto web materials are well known in the art and include for example application of a treatment-containing liquid, such as a solution, emulsion or suspension of the treatment additive in a carrier liquid, onto the web material to be treated. Such a treatment-containing liquid may be applied to the web material using brush treaters, spray treaters, foam treaters or saturation/immersion bath treaters. Then, after the treatment-containing liquid has been applied to the web material, the web may be allowed to dry or may be dried by applied vacuum, heated air, radiant heat such as infrared heating or radio frequency heating, contact heat such as by passing the web over steam-heated canisters, etc., or combinations thereof.

As an alternative to (or in addition to) topical treatment, a repellency treatment may be incorporated directly into the fibers of a nonwoven web material via melt extrusion of one or more additive. Such internal melt additives may be added directly to the thermoplastic polymer melt composition which is to produce the fibers of the nonwoven web. For ease of incorporating such melt additives, the additive may be compounded with a base of one or more polymers. For example, one or more fluorochemicals mentioned above may be compounded into an additive-polymer compound as a "masterbatch" or "concentrate" at (for example) a 20 percent by weight loading level. Then, during the melt production of fibers, if the 20 percent additive-polymer concentrate is added to the other virgin polymer or polymers to be extruded at a rate of 5 kilograms of additive-polymer compound to 95 kilograms of virgin polymer, the resulting fibers contain about 1 percent by weight of the melt additive.

As stated, one or more of the nonwoven webs of the acoustic insulating material may include multicomponent fibers. In this regard, where the low surface tension fluids repellency treatment is added to the fibers via internal melt addition instead of or in addition to topical treatment, it may be possible to reduce the amount of repellency treatment required to produce the desired repellent effects by either using the repellency treatment in less than all of the components of a multicomponent fiber, or by using the repellency treatment in all components but using decreased concentrations in one or more of the components.

Polymers known to be generally suitable for melt extrusion of fibers and fibrous nonwoven webs include polyolefins, polyesters, polyamides, polycarbonates and copolymers and blends thereof. Suitable polyolefins include polypropylene, e.g., isotactic polypropylene, syndiotactic polypropylene, blends of isotactic polypropylene and atactic polypropylene; polyethylene, e.g., high density polyethylene, medium density polyethylene, low density polyethylene and linear low density polyethylene; polybutylene, e.g., poly(1-butene) and poly(2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, poly-butylene terephthalate, polytetramethylene terephthalate, polycyclohexylene-1,4-dimethylene terephthalate, and isophthalate copolymers thereof, as well as blends thereof. Selection of polymers for fibers and/or films is guided by end-use need, economics, and processability. The list of suitable polymers herein is not exhaustive and other polymers known to one of ordinary skill in the art may be employed.

With regard to melt extrusion of meltblown fibers, it is desirable to utilize a polymer having a high melt flow rate. Exemplary high melt flow rate polymers include those provided by adding a prodegradant such as a peroxide to conventionally produced polymers such as those made by Ziegler-Natta catalysts in order to partially degrade the polymer to increase the melt flow rate and/or narrow the molecular weight distribution. Peroxide addition to polymer pellets is described in U.S. Pat. No. 4,451,589 to Morman et al. and improved barrier microfiber nonwoven webs which incorporate peroxides in the polymer are disclosed in U.S. Pat. No. 5,213,881 to Timmons et al. In addition to peroxidated polymers, high melt flow rate polymers are known which as polymerized comprise polymers having a narrow molecular weight distribution and/or low polydispersity (relative to conventional olefin polymers such as those made by Ziegler-Natta catalysts) and include those catalyzed by "metallocene catalysts", "single-site catalysts", "constrained geometry catalysts" and/or other like catalysts. Examples of such catalysts and/or olefin polymers made therefrom are described in, by way of example only, U.S. Pat. No. 5,153,157 to Canich, U.S. Pat. No. 5,064,802 to Stevens et al., U.S. Pat. No. 5,374,696 to Rosen et al., U.S. Pat. No. 5,451,450 to Elderly et al., U.S. Pat. No. 5,204,429 to Kaminsky et al., U.S. Pat. No. 5,539,124 to Etherton et al., U.S. Pat. Nos. 5,278,272 and 5,272,236, both to Lai et al., U.S. Pat. No. 5,554,775 to Krishnamurti et al. and U.S. Pat. No. 5,539,124 to Etherton et al. Exemplary polymers having a high melt flow rate, narrow molecular weight distribution and low polydispersity are disclosed in U.S. Pat. No. 5,736,465 to Stahl et al. and are available from ExxonMobil Chemical Company of Houston, Tex. under the trade name ACHIEVE.

In addition, it may be desirable that one or more of the polymers used is an elastomeric polymer, although it should be noted that, where small fibers such as meltblown microfibers are desired, these may be more easily achieved using substantially non-elastic polymers. Many elastomeric polymers are known to be suitable for forming fibers, foams and films. Elastic polymers useful may be any suitable elastomeric fiber forming resin including, for example, elastic polyesters, elastic polyurethanes, elastic polyamides, elastic copolymers of ethylene and at least one vinyl monomer, block copolymers, and elastic polyolefins. Examples of elastic block copolymers include those having the general formula A-B-A' or A-B, where A and A' are each a thermoplastic polymer endblock that contains a styrenic moiety such as a poly (vinyl arene) and where B is an elastomeric polymer midblock such as a conjugated diene or a lower alkene polymer such as for example polystyrene-poly(ethylene-butylene)-polystyrene block copolymers. Also included are polymers composed of an A-B-A-B tetrablock copolymer, as discussed in U.S. Pat. No. 5,332,613 to Taylor et al. An example of such a tetrablock copolymer is a styrene-poly (ethylene-propylene)-styrene-poly(ethylene-propylene) or SEPSEP block copolymer. These A-B-A' and A-B-A-B copolymers are available in several different formulations from Kraton Polymers US, LLC of Houston, Tex. under the trade designation KRATON®.

Examples of elastic polyolefins include ultra-low density elastic polypropylenes and polyethylenes, such as those produced by "single-site" or "metallocene" catalysis methods. Such polymers are commercially available from the Dow Chemical Company of Midland, Mich. under the trade name ENGAGE®, and described in U.S. Pat. Nos. 5,278,272 and 5,272,236 to Lai et al. entitled "Elastic Substantially Linear Olefin Polymers". Also useful are certain elastomeric polypropylenes such as are described, for example, in U.S. Pat. No. 5,539,056 to Yang et al. and U.S. Pat. No. 5,596,052 to Resconi et al., incorporated herein by reference in their entireties, and polyethylenes such as AFFINITY® EG 8200 from Dow Chemical of Midland, Mich. as well as EXACT® 4049, 4011 and 4041 from ExxonMobil Chemical Company of Houston, Tex., as well as blends.

EXAMPLE

To test the acoustic insulating properties of composite acoustic insulating materials having a film facing layer versus a nonwoven facing layer, the two types of composite materials were tested for sound absorption coefficient. Both of the composite acoustic insulating materials included a high-loft nonwoven web material which was layered with either the film facing layer or the nonwoven facing layer to form a composite. The high-loft nonwoven web material was QUIETECH® SP500 acoustic insulation available from the Kimberly-Clark Corporation, Dallas, Tex. The QUIETECH® SP500 nonwoven was a through-air bonded 6 osy (about 200 gsm) spunbond web material made from polyethylene-polypropylene side-by-side crimped bicomponent fibers and was about 12.7 millimeters thick. Samples of the QUIETECH®D SP500 material were adhesively laminated to the film facing and the nonwoven facing. The film facing used was a 78 gsm FABRIFLEX® film/nonwoven laminate material available from the Tredegar Film Products Corporation, Richmond, Va. The FABRIFLEX® material was a polyethylene film sandwiched between two polypropylene spunbond nonwoven layers. The nonwoven facing used was a 51 gsm polypropylene spunbond-meltblown-spunbond or SMS material obtained from the Kimberly-Clark Corporation, Dallas, Tex.

Figure 5:
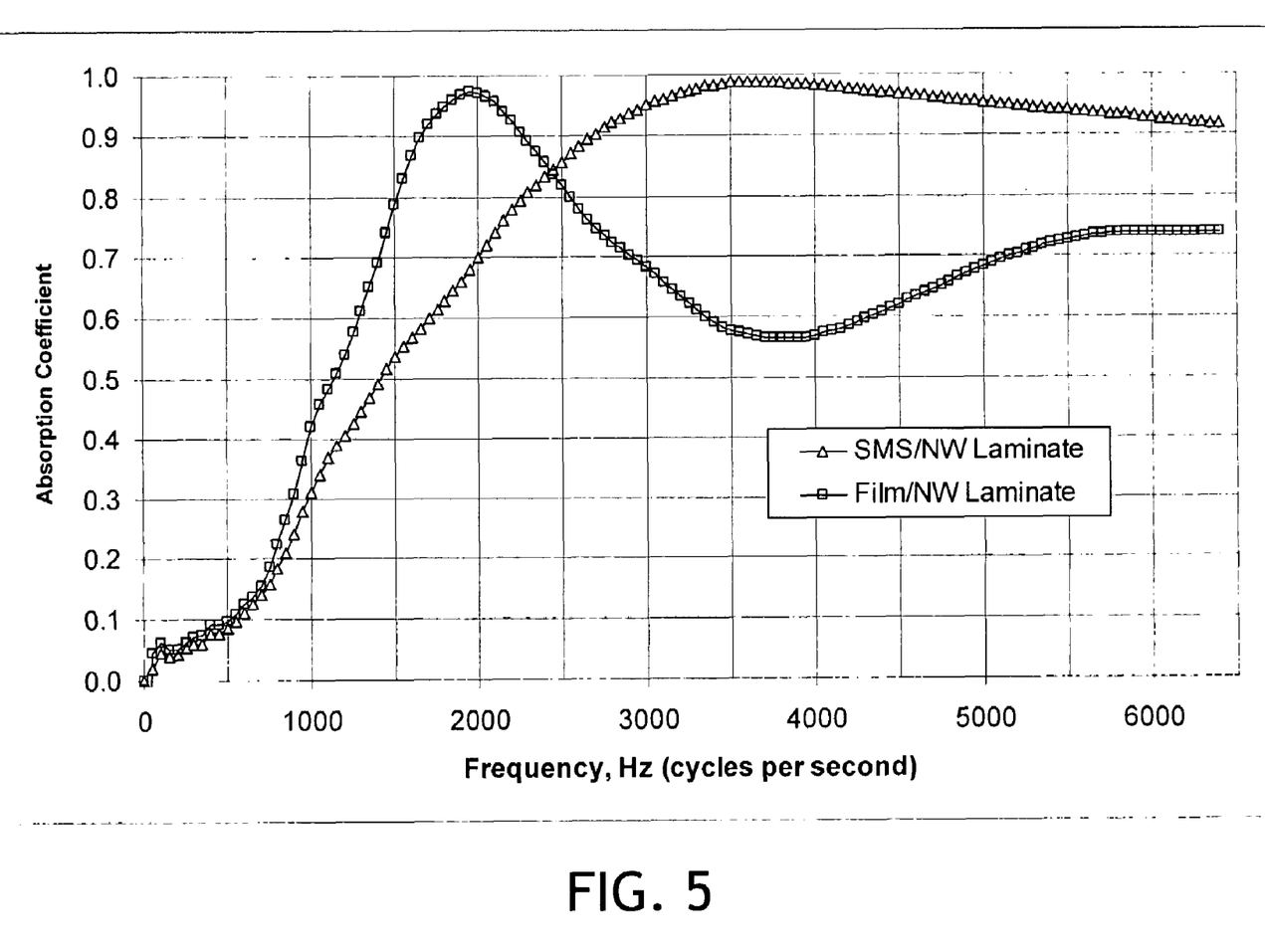
FIG. 5 is a chart showing sound absorption coefficients for acoustic insulation materials.

The absorption coefficient testing was performed on the two composite insulation materials using a Model # 4206 acoustical impedance tube, available from Bruel & Kjaer Instruments A/S, Naerum, Denmark, and in accordance with the American Society for Testing and Materials (ASTM) Test E1050-98. A material having a higher ability to absorb sound at a given frequency will have a higher sound absorption coefficient. The sound absorption coefficient was recorded at sound frequencies up to 6400 cycles per second (Hz) in increments of 2 Hz. The results were graphed and are shown in FIG. 5 except that, for the sake of clarity, the results graphed are at increments of 50 Hz instead of increments of 2 Hz. As can be seen from the results in FIG. 5, the composite material having the film facing performs well only up to about a frequency of 2000 Hz, from which point its absorption coefficient then rapidly drops off. The SMS-faced composite material, on the other hand, maintains a higher absorption coefficient over a much wider range of frequencies. For example, by numerical average the average absorption coefficient for the film-faced composite over the entire range of frequencies tested is about 0.61 compared to about 0.73 for the SMS-faced composite. As can be seen in FIG. 5, this result is even more pronounced at higher sound frequencies; for example, from 3000 Hz to 6400 Hz the average absorption coefficient for the film-faced composite is about 0.67 compared to about 0.96 for the SMS-faced composite.

Next, a sample of the 51 gsm SMS material and another sample of a similar but heavier basis weight, 85 gsm, SMS material (also obtained from Kimberly-Clark Corporation) were tested and found to be readily wetted by low surface tension fluids such as solutions of automotive detergents and ordinary dish-washing detergents in water. That is, when the solutions were added by dropper to a horizontally situated piece of each material, the solutions migrated through the material to wet the back of the material.

Next, samples of the 51 and 85 gsm polypropylene SMS materials were treated topically with a fluorochemical repellency treatment emulsion. The repellency treatment was a commercially available ZONYL® brand fluorochemical available from E. I. du Pont de Nemours and Company of Wilmington, Del. The treatment was allowed to dry and when dry, the add-on level of the repellency treatment was approximately 0.35 weight percent of the weight of the SMS material. The treated materials provided a qualitatively visible repellency when tested against soapy water such as the above-mentioned detergent-in-water solutions, windshield washer fluids and low viscosity oils. That is, when these liquids were applied by dropper onto the repellency treated SMS material, the test liquids beaded up on the surface of the material and were unable to penetrate through the material, even after five minutes had elapsed.

The repellency of nonwoven materials to water and low surface tension fluids may be more formally tested by determining the materials' repellency to a series of solutions of isopropyl alcohol in water as follows. Drops of the isopropyl alcohol/water solutions are placed on the surfaces of the materials. The solutions contain isopropyl alcohol at volumetric concentrations in water of 20%, 30%, 40%, 50%, 60%, 70%, 80%, 90% and 99%. As the level of isopropyl alcohol in the solution is increased, the solution surface tension decreases and it becomes more difficult for a given material to effectively repel the solution. As a reference point, 100% isopropyl alcohol has a surface tension of about 22 dynes/cm.

To perform the alcohol repellency test, eight drops of each isopropyl alcohol/water solution are placed along the cross machine direction of the material being tested. After five minutes, a repellency rating number is given. The repellency rating number is the concentration percentage of the solution with the highest percentage isopropyl alcohol that does not wet the material. The back of each material is observed to determine if the material is wetted through by the isopropyl alcohol solution. If one or more of the eight drops of an isopropyl alcohol solution wet the material, then the material is failed at that concentration level. In some cases, a rating between increments of 10% isopropyl alcohol may be given.

For example, a rating of 85% isopropyl alcohol indicates that the material easily repels 80% isopropyl alcohol but only a drop or two of the eight drops of 90% isopropyl alcohol just slightly wets the material.

The density of the nonwoven acoustic insulating material or of individual layers of the acoustic insulating material may be measured by dividing the basis weight of the material by the thickness of the material. The basis weight may be measured by simply weighing a known sample size, such as a 10 cm by 10 cm square of material. The thickness of the piece of material may be measured under a 7.62 cm diameter circular platen at a load of 0.05 psi (3.5 g/cm2 or 0.345 KPa) using a STARRET-7 type bulk tester.

The pressure drop of a web material is a measure of the force required to get a volume of air through a sheet of the web material. The pressure drop may be measured in units of millimeters of water in accordance with ASTM F 778-88 test method, "Standard Methods for Gas Flow Resistance Testing of Filtration Media". Desirably, the nonwoven acoustical insulation material or one or more layers of the acoustic insulating material should have a pressure drop at least about 1 mm water at a flow rate of about 32 liters/minute, and more desirably, a pressure drop of about 3 to about 12 mm water.

The Frazier permeability or air permeability of the nonwoven acoustic insulating material or of individual layers of the acoustic insulating material may be measured using a Frazier Air Permeability tester available from Frazier Precision Instrument Company and measure in accordance with Federal Test Method 5450, Standard No. 191A (ASTM D737-96). Desirably, the air permeability should be less than about 75 cubic feet per minute per square foot ($cfm/ft^2$) (about 23 cubic meters per minute per square meter ($m^3/min/m^2$), and more desirably less than about 50 $cfm/ft^2$ (about 15 $m^3/min/m^2$) and still more desirably less than about 30 $cfm/ft^2$ (about 9 $m^3/min/m^2$).

Various additional finishes, additives, and/or potential processing steps known in the art may desirably be performed on nonwoven fibrous webs and will not be described herein in detail. Briefly, examples include such as slitting to desired width, stretching or treating of material layers. In addition, treatment to provide antistatic properties may be desirable. Antistatic treatments may be applied topically by spraying, dipping, etc., and an exemplary topical antistatic treatment is a 50% solution of potassium N-butyl phosphate available from the Stepan Company of Northfield, Ill. under the trade name ZELEC. Another exemplary topical antistatic treatment is a 50% solution of potassium isobutyl phosphate available from Manufacturer's Chemical, LP, of Cleveland, Tenn. under the trade name QUADRASTAT.

While various patents have been incorporated herein by reference, to the extent there is any inconsistency between incorporated material and that of this written specification, the written specification shall control. In addition, while the invention has been described in detail with respect to specific embodiments thereof, it will be apparent to those skilled in the art that various alterations, modifications and other changes may be made to the invention without departing from the spirit and scope of the present invention. It is therefore intended that the claims cover all such modifications, alterations and other changes encompassed by the appended claims.

The invention claimed is:

1. A nonwoven acoustic insulating material having liquid repellency properties, the acoustic insulating material comprising a sound generation area-facing nonwoven web layer comprising a nonwoven web having a topical treatment of a fluorochemical that imparts water and low-surface-tension fluid repellency to the Sound generation area-facing nonwoven web layer, and b) a sound receiving area-facing nonwoven web layer comprising a high-loft multicomponent fiber nonwoven web layer; and said acoustic insulating material exhibits a sound absorption coefficient of greater than about 0.8 at a sound frequency of higher than 2500 Hz.

2. The nonwoven acoustic insulating material according to claim 1, wherein said acoustic insulating material exhibits a sound absorption coefficient of greater than about 0.85 for a sound frequency of about 2500 Hz and greater.

3. A fluid repellent nonwoven acoustic insulating material comprising a sound generation area-facing nonwoven web layer and a sound receiving area-facing layer, wherein the sound generation area-facing nonwoven web layer comprises a low surface tension fluids repellency treatment and wherein the low surface tension fluids repellency treatment comprises a topical fluorochemical treatment.

4. The fluid repellent nonwoven acoustic insulating material of claim 3, wherein the sound receiving area-facing layer is selected from the group consisting of nonwoven layers, shoddy layers, fiberglass layers, mineral fiber layers and foam layers.

5. The fluid repellent nonwoven acoustic insulating material of claim 3, wherein the sound generation area-facing nonwoven web layer comprises a meltblown web layer and wherein the Sound receiving area-facing layer comprises a high-loft multicomponent fiber nonwoven web layer.

6. The fluid repellent nonwoven acoustic insulating material of claim 3, wherein the sound generation area-facing nonwoven web layer comprises a spunbond-meltblown-spunbond laminate web layer and wherein the sound receiving area-facing layer comprises a high-loft multicomponent fiber nonwoven web layer.

7. The fluid repellent nonwoven acoustic insulating material of claim 6, wherein the spunbond-meltbiown-spunbond laminate web has a sound generation area-facing spunbond layer and a spunbond layer adjacent the high-loft multicomponent fiber nonwoven web and wherein the low surface tension fluids repellency treatment is present in a higher concentration in the sound generation area-facing spunbond layer of the spunbond-meitbiown-spunbond laminate web than in the spunbond layer adjacent the high-loft multicomponent fiber nonwoven web layer.

8. A method for attenuating transmitted sound and repelling fluids, the method comprising
   providing a nonwoven acoustic insulating material comprising a sound generation area-facing nonwoven web layer and a sound receiving area-facing layer, wherein the sound generation area-facing nonwoven web layer comprises a low surface tension fluids repellency treatment, wherein the low surface tension fluids repellency treatment comprises a topical fluorochemical treatment, and
   interposing the nonwoven acoustic insulating material between a Sound generation area and a sound receiving area.

9. The method of claim 8, wherein the sound generation area-facing nonwoven web layer is selected from the group consisting of meltblown webs, spunbond webs and laminates thereof.

10. The method of claim 9, wherein the sound generation area-facing nonwoven web layer comprises a laminate comprising at least one spunbond web and at least one meltblown web.

11. The method of claim 9, wherein sound generation area-facing nonwoven web layer comprises a spunbond-meltblown-spunbond laminate web.

12. The method of claim 11, wherein the spunbond-meltblown-spunbond laminate web has a sound generation area-facing spunbond layer and a sound receiving-area facing spunbond layer and wherein the low surface tension fluids repellency treatment is present in a higher concentration in the sound generation area-facing spunbond layer of the spunbond-meltblown-spunbond laminate web than in the sound receiving-area facing spunbond layer.

13. The method of claim 8, wherein the sound receiving area-facing layer is selected from the group consisting of nonwoven layers, shoddy layers, fiberglass layers, and mineral fiber layers.

14. The method of claim 13, wherein the sound receiving area-facing layer is a high-loft multicomponent fiber nonwoven web layer.

15. The method of claim 11, wherein the sound receiving area-facing layer comprises a high-loft multicomponent fiber nonwoven web layer laminated to the sound generation area facing layer spunbond-meltblown-spunbond laminate web.

16. The method of claim 15, wherein the spunbond-meltblown-spunbond laminate web has a sound generation area-facing spunbond layer and a spunbond layer adjacent the high-loft mutticomponent fiber nonwoven web and wherein the low surface tension fluids repellency treatment is present in a higher concentration in the sound generation area-facing spunbond layer of the spunbond-meltblown-spunbond laminate web than in the spunbond layer adjacent the high-loft multicomponent fiber nonwoven web layer.

* * * * *